No. 632,173. Patented Aug. 29, 1899.
R. CAMERON.
LAWN MOWER.
(Application filed Jan. 5, 1898.)
(No Model.)
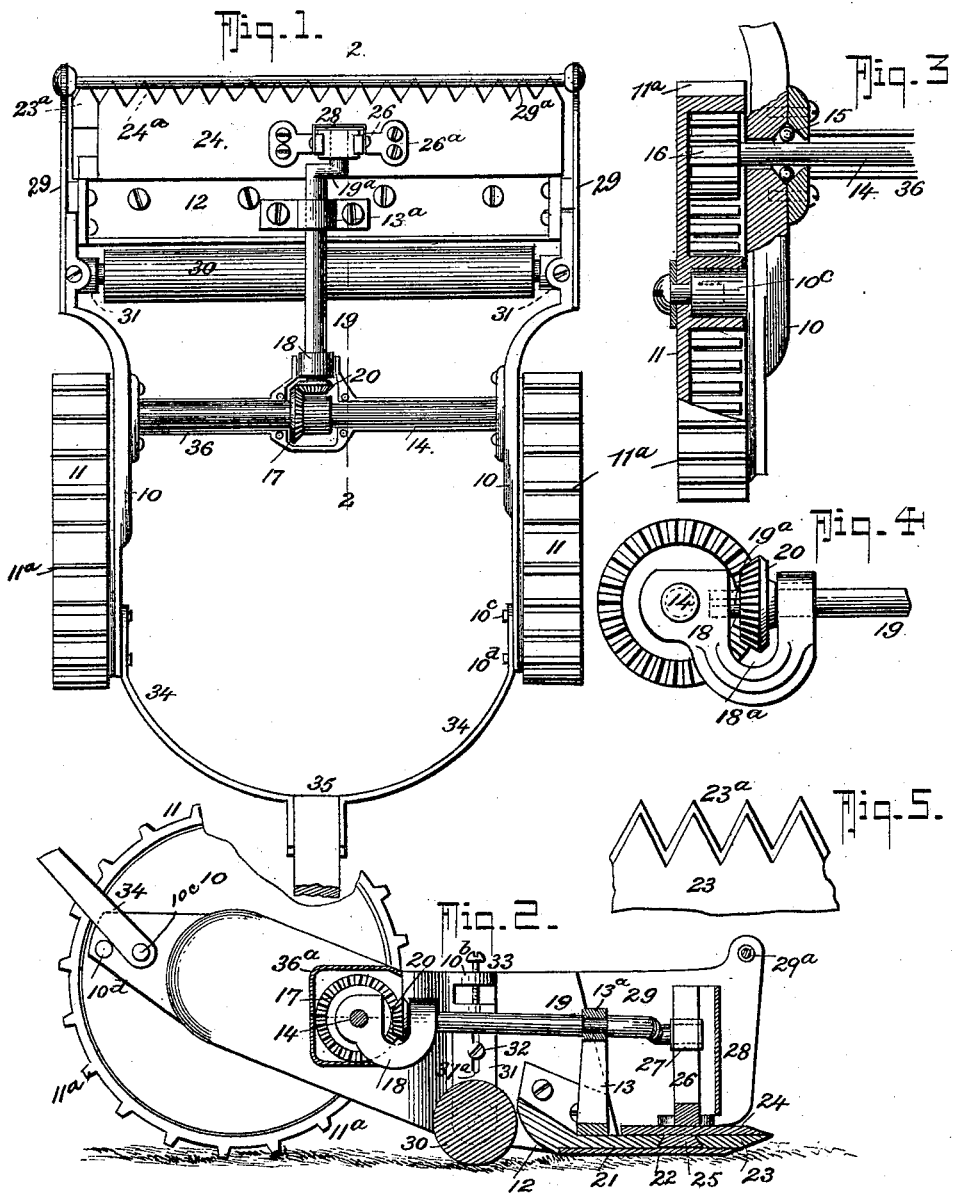
WITNESSES:
E. McCormic
A. C. Dieterich
INVENTOR
Robert Cameron
BY
Fred G. Dieterich
ATTORNEY.
THE NORRIS PETERS CO., PHOTO-LITHO., WASHINGTON, D. C.

UNITED STATES PATENT OFFICE.

ROBERT CAMERON, OF VANCOUVER, CANADA, ASSIGNOR OF ONE-HALF TO GEORGE HENRY ST. DENIS, OF MEDFORD, MASSACHUSETTS.

LAWN-MOWER.

SPECIFICATION forming part of Letters Patent No. 632,173, dated August 29, 1899.

Application filed January 5, 1898. Serial No. 665,629. (No model.)

*To all whom it may concern:*

Be it known that I, ROBERT CAMERON, a citizen of the Dominion of Canada, residing at Vancouver, in the Province of British Columbia, Canada, have invented a new and useful Lawn-Mower, of which the following is a specification.

My invention relates to that class of lawn-mowers in which the cutting is done by a reciprocating cutter-knife working in conjunction with a similar knife inverted and rigidly fixed to the frame of the machine; and my object is to provide a lawn-mower that will clip the grass neatly around and close to growing trees or shrubs without injury thereto and close up into nooks and corners that are common to most gardens and lawns and by the simplicity of the parts that may be readily taken apart to be sharpened or repaired when worn or broken. I attain this object by the mechanism illustrated in the accompanying drawings, in which—

Figure 1 is a plan view of my improved mower. Fig. 2 is a vertical section of the same on the line 2 2 of Fig. 1. Fig. 3 is a detail view of the power-transmitting mechanism. Fig. 4 is a detail view, on an enlarged scale, of the cutter-operating-shaft drive mechanism, and Fig. 5 is an enlarged detail view of the cutter-teeth.

Similar figures refer to similar parts throughout the several views, in which—

10 is a frame having its two opposite sides rigidly connected together by parts that will be fully set forth presently. Suitably arranged on the hubs $10^c$, projecting from the said frame, are main drive-wheels 11, which are similar to the drive-wheels of the ordinary lawn-mower, except as will hereinafter be stated. The portions of the frame 10 which lie in proximity to the wheels 11 are arranged in disk shape, and at the lower side of the opposite ends of the side portions of the said frame is a cross-frame 12. This frame 12 is flattish, and its rear edge has an upward trend, (see Fig. 2,) and securely fixed to this cross-frame is a pillar 13, at the top of which is arranged a journal-box $13^a$.

Passing through the frame 10 and journaled therein on a line within the inner peripheries of the said wheels 11 is a shaft 14. This shaft 14 is journaled in ball-bearings 15, (see Fig. 3,) and on its extreme ends are securely fixed toothed pinions 16, which mesh into internal gear in the wheels 11, and thus when movement is imparted to the said wheels 11 the shaft 14 will revolve rapidly. These pinions and the internal gear in the wheels 11 are not new, but are here employed as elements to my invention.

Secured about the center on the shaft 14 is a bevel gear-wheel 17, and, as better shown in Fig. 4, a yoke 18 is pivotally arranged on the said shaft in proximity to the gear-wheel 17, the opposite end of which receives and supports a shaft 19. This shaft 19 passes through an aperture in the said yoke and in line with the shaft 14, but at right angles thereto, and the end being journaled in a suitable recess in the opposite end portion of the same, and the opening $18^a$ therein receives a small bevel spur-wheel 20, which is keyed to the shaft 19, as at $19^a$, and which has engagement with the bevel-gear 17. The opposite end of the shaft 19 is received and supported at some distance from the end thereof in the before-mentioned journal-box $13^a$, and the end of the said shaft is provided with a crank $19^a$, the reason for which will presently appear.

Securely fixed to the under side of the cross-frame 12 and at about a level plane with the lower periphery of the wheels 11 is a flat metal plate 21, extending across the entire forward part of the machine, as shown. On the upper side of this plate 21 the forward and upper part of the cross-frame 12 is projected over, forming an acute angle, and on the forward portion of the plate 21 is a plate 23, which has a rear projection toward the cross-frame 12, and thus forming a dovetailed groove or slideway which receives and retains the depending rib 25, which is made to fit and slide in the groove 22, and the said rib 25 is an integral part of the plate or cutter 24. As shown in Figs. 1 and 2, the forward portions of these plates 23 and 24 have their edges fluted at acute angles, and thus forming teeth $23^a$ and $24^a$, which, owing to being beveled from the opposite sides, act like shears or clippers when the upper or movable blade is reciprocated, as will presently be described.

Arranged on the movable plate 24 is an upright 26, which is secured thereto by the screws or bolts 26$^a$, and this upright is longitudinally slotted, so that the collar or slidable box 27, which is pivotally fixed on the crank of the shaft 19, is received therein, and owing to the projecting vertical edges of the box 27 overlapping the forks of the upright 26 and the smooth fit thereof on the revolution of the crank 19$^a$ the box or collar will rise and fall in the said slot, and consequently the upper plate 24, which is attached to the said upright, will be reciprocated back and forth and whereby all fibrous matters coming between the said teeth will be trimmed off.

To prevent grass and other matters from coming in contact with the moving collar 27, between the bifurcations of the upright 26, I provide a cover 28, which is preferably a sheet-metal strip passed over the front of the opening and fastened to either side of the upright, as shown. This protects the front opening, and the rear opening does not require such protection, as the cut grass is moving rearward and will therefore pass by.

As shown in Figs. 1 and 2, secured to and extending forward from the two opposite sides of the frame 10 are plates 29. These side plates 29 rise to a short distance below the plane of the top of the frame 10 and extend forward to a little beyond a perpendicular line with the teeth of the blades 23 and 24 and the cross-bar 29$^a$, rigidly connecting the two side frames together, prevents the machine from being brought in contact with trees or shrubs, and thus protects them from injury.

Placed just in the rear of the upwardly-curved cross-frame 12 is a roller 30. This roller 30 is for supporting the cutter-blades the proper distance above the ground to cut the grass the desired length, and by reason of the same being journaled in the adjustable brackets 31, which have slots 31$^a$ to receive the set-screws 32, the same may be placed high or low, and thus set the cutters the desired height from the ground. To provide for the extra securement of the brackets 31, carrying the said roller, I employ the set-screws 33, passing vertically downward through the upper walls of the slots or recesses 10$^b$ of the frame 10, as shown, and thus clamping the said brackets tightly from above.

34 indicates ordinary straps connecting the frame 10 with the handle 35 by means of apertures in the ends of the said straps taking over the projections 10$^c$ on the inner walls of the frame 10, and by reason of like projections 10$^d$ engaging beneath the straps the handle is poised in an upward position.

As shown in Figs. 1 and 2, to prevent the grass or other matters coming in proximity with the bevel-gears 17 and 20 on the shafts 14 and 19 I provide the casing or covering 36, which is in two parts, and it is enlarged at the said gearing, as at 36$^a$, so that the moving parts will run freely without unnecessary friction. The mode of attaching this covering is by attaching the lower section to the opposite sides of the frame 10, and when the top is applied four screws at the corners of the enlarged portion 36$^a$ will secure it down.

To prevent the large or drive wheels 11 from skidding over the ground when the grass is wet and slippery, I form these wheels larger than the wheels in the ordinary mower, and on their peripheries I provide the deep recesses divided by the ribs 11$^a$, placed at some distance apart, as shown in Fig. 2. This has a twofold advantage. The purchase is greater for the operator, the tendency to skid is reduced to a minimum, and the shaft 14, and consequently the shaft 19, is increased in speed by the increased number of teeth in the annular recesses of the wheels 11.

In the operation of my invention the teeth of the cutter-blades are of sharpened beveled shape to meet from opposite sides. The handle 35, which may be of the ordinary style, is pushed forward, and as the machine is propelled along the wheels 11 will revolve, and will thus reciprocate the cutter-blade 24 through the medium of the pinions 16, the shaft 14, and the gears and the crank-shaft 19, and as the cutters are brought in contact with the grass the same will be clipped off at a uniform level. It will also be seen that by passing the machine into corners and close to shrubs and trees the trimming will be done therein and around in a neat and pleasing manner.

I am aware that prior to my invention lawn-mowers with reciprocating cutters have been employed, the most common of which have but the one cutter-blade reciprocating within slots in the rear of extending cone-shaped fingers, and I am also aware that lawn-mowers having reciprocating cutters which are operated by a cam-and-lever mechanism from the drive-wheels and also from a cam on the drive-shaft have been used. Therefore I do not claim such means of operating my machine; but

What I claim is—

The hereinbefore-described improvements in lawn-mowers, comprising, in combination; a front horizontal frame portion carrying fixedly-held cutters, a reciprocating cutter-blade having a flanged guide 25, engaging guideways in the fixedly-held cutter, said frame having upwardly and rearwardly extending side portions; the drive-shaft 14, journaled therein and having cog-gears 16, the drive-wheels 11, having internal gears, said shaft 14, having a bevel-gear 17; the yoke 18, hung from the shaft 14, and provided with a bearing-opening receiving the same, said yoke 18 having a forwardly-extending bearing; the shaft 19, journaled in such bearing and having a gear 20, meshing with the gear 17; a fixedly-held bearing 13, for the shaft 19; an upright 26, secured to the movable cutter; the shaft 19 having a crank engaging such upright; and the adjustable supporting-roller 30, all being arranged substantially as shown and described.

ROBERT CAMERON.

Witnesses:
W. S. IN THEUELY,
J. T. WILKINSON.